United States Patent Office 3,523,907
Patented Aug. 11, 1970

3,523,907
METHOD FOR ENCAPSULATING WATER AND COMPOUNDS IN AQUEOUS PHASE BY EXTRACTION
Marcel Nicolas Vrancken, Hove, and Daniel Alois Claeys, Mortsel, Belgium, assignors to Gevaert Photo-Producten N.V., Mortsel, Belgium, a company of Belgium
No Drawing. Continuation-in-part of application Ser. No. 292,470, July 2, 1963. This application Apr. 25, 1968, Ser. No. 724,216
Claims priority, application Netherlands, July 11, 1962, 280,826
Int. Cl. A61k 9/04; B01j 13/02; G03c 1/10
U.S. Cl. 252—316       5 Claims

ABSTRACT OF THE DISCLOSURE

In a process of encapsulating water or a compound in aqueous phase in a polymerized material soluble in a water-immiscible solvent and forming when free of the solvent a dry solid film insoluble in the water or aqueous phase in which the polymerized material is dissolved in a water-immiscible solvent therefor, the water or aqueous phase is emulsified within the resulting solution and the polymeric material is caused to deposit out of said solution around the dispersed phase particles of said water or aqueous phase by the addition of a liquid which is co-miscible with water and with the solvent but does not dissolve the polymeric material, the improvement of emulsifying the emulsion of water or aqueous phase in the polymer solution in an aqueous solution of a hydrophilic colloid prior to the addition of the co-miscible liquid. The polymerized material can be any vinyl polymer or copolymer, polycarbonate, polyester, polysulfonate, polyurethane, polyamide, chlorinated natural rubber or cellulose derivative having the above-noted characteristics.

---

The invention relates to a process for encapsulating water or compounds in aqueous phase and more especially to the encasing of water or compounds in aqueous phase in microcapsules the wall of which is applied from solutions of polymers in a water-immiscible organic solvent. By compounds in aqueous phase are understood aqueous solutions of compounds as well as aqueous dispersions of compounds.

The present application is a continuation-in-part of our application Ser. No. 292,470, filed July 2, 1963, now abandoned.

The encasing of water in macrocapsule is described among others in U.S. patent specifications No. 2,580,683, No. 2,667,268, No. 2,780,355 and No. 2,990,334, in the Dutch patent specification No. 70,246 and the Canadian patent specification No. 553,398. The processes for forming said macrocapsules are mostly based upon the preliminary formation of the capsule wall whereupon the liquid is mechanically incorporated into the capsule formed, among others by injection or centrifuging.

In the Canadian patent specification No. 645,952 a process is described for encapsulating a hydrophilic liquid, which liquid for this purpose is emulsified together with a thickening agent in an oil phase containing an anti-inversion agent. The emulsion obtained is poured into an aqueous solution of a synthetic polymer while strongly stirring whereby a secondary emulsion is formed. The solution of the synthetic polymer can be coacervated for instance by adding a salt solution. When the ratio of coacervating agent to polymer reaches a critical value coacervation occurs. A liquid wherein the polymer is insoluble, for instance dioxan, can also be used as coacervating agent. According to the Canadian patent specification No. 645,951, the primary emulsion of water in oil in its turn can be emulsified in an aqueous medium of at least two colloids at least one of which is gelable. Coacervation of the polymer may occur either by diluting the solution or by varying the pH of the solution.

The disadvantage of this process is that a primary emulsion of water in oil has to be formed since the polymeric capsule wall is formed from an aqueous medium. For certain applications of these water containing capsules the presence of oil after removing the capsule wall may be hindering.

In British patent specification No. 920,866, a process is described for encapsulating solid substances which are sensitive to water. Said solid substances are dispersed in an organic solution of a hydrophobic polymer. At a determined temperature above room temperature a substitute liquid, which is miscible with the solvent for the polymer but which itself is no solvent for the polymer, is added while strongly stirring, so that the polymer deposits around the solid substance. By washing abundantly with said substitute liquid the solvent is withdrawn from the polymer and the temperature is decreased till room temperature so that a solid polymeric capsule wall remains.

A process has now been found for encapsulating in preformed, film-forming, hydrophobic polymeric material soluble in a water-immiscible solvent, a member selected from the group consisting of water and compounds in aqueous phase, comprising the following steps:

(a) forming a solution of said preformed, film-forming, hydrophobic polymeric material in a solvent therefor which is immiscible with water,
(b) emulsifying said member in said solution of said preformed, film-forming, hydrophobic polymeric material,
(c) emulsifying the emulsion obtained from (b) in an aqueous solution of a hydrophilic colloid, and
(d) extracting the solvent for the polymeric material by adding a liquid which is miscible with water and with the solvent for said polymeric material, said liquid being no solvent for the polymeric material.

By emulsifying the primary emulsion formed from water and dissolved preformed, film-forming, hydrophobic polymer in the aqueous solution of the hydrophilic colloid a secondary emulsion is formed, each water droplet being surrounded by a film of polymer solution.

By the addition of an appropriate liquid the solvent for the polymer is extracted. This extraction causes the polymer to solidify as a more or less thick film around the water droplets or droplets of compounds in aqueous phase.

If necessary the capsules may be hardened, separated and dried according to known methods. When the capsules are not to be separated the emulsion containing them may be directly coated as a layer. The size of the microscopic capsules formed may vary within wide limits namely from some hundreds of microns to a fraction of a micron. Said size depends first of all on the dispersion degree of the water droplets. When these water droplets are small and emulsified in a large amount of polymer solution, very small capsules may be obtained.

A patent application filed on even date herewith relates also to a process for encapsulating water or compounds in aqueous phase. According to this process the water or compounds in aqueous phase are emulsified in a polymer solution, the solvent for said polymer being water-immiscible and having a boiling point lower than 100° C. Then the emulsion obtained is emulsified in an aqueous solution of a hydrophilic colloid whereupon the solvent for the polymer is evaporated by heating, thus causing the polymer to deposit around the water droplets or droplets of compounds in aqueous phase.

Contrary to the process of the application filed on even date herewith the present process has the advantage that there is a much wider choice of hydrophobic, film-forming polymers suited for forming the capsule wall. In the present process hydrophobic, film-forming polymers which are soluble in high-boiling solvents, in as much as these solvents are water-immiscible, are also suited.

The preformed, film-forming, hydrophobic polymer is dissolved in a solvent which is immiscible in water. Here can be used the information compiled in the book of C. Marsden: Solvents Manual and Solubility Chart, Elsevier Press Inc., New York, 1954. As to the miscibility or immiscibility of the most common solvents with water this can be found in the tables on pages 1394 to 1401 of D'Ans und Lax: Taschenbuch für Chemiker und Physiker, Springer Verlag, Berlin 1949. The miscibility of different solvents with each other has been given in the tables on pages 1500 to 1507 of Handbook of Chemistry and Physics, 42th edition, The Chemical Rubber Publishing Co., Cleveland, Ohio, 1960.

In the process according to the invention, practically all preformed, film-forming, hydrophobic polymers in as much as they are stable in water and soluble in a water-immiscible solvent are suited for forming the capsule wall.

Polymers suited for being used in the invention are e.g. addition polymers formed by polymerisation or copolymerisation of vinyl monomers such as styrene, vinyl chloride, vinylidene chloride, vinyl esters, vinyl ethers, acrylic acid esters and methacrylic acid esters, acrylonitrile and methacrylonitrile and other unsaturated monomers, their derivatives and reaction products, provided said polymers meet the above requirements. Further, condensation polymers such as soluble poly(carbonates), poly(esters), poly(sulfonates), poly(urethanes), poly(amides) etc. and natural products such as chlorinated natural rubber and cellulose derivatives such as ethylcellulose are also suited.

According to the process of the invention the primary emulsion of water in a polymer solution is in its turn emulsified in an aqueous solution of a hydrophilic colloid. Hydrophilic colloids which are best suited for being used according to the invention are gelatin and gelatin derivaties. However, other hydrophilic polymers such as poly(vinyl alcohol), poly(styrene sulfonic acid), hydroxyalkyl celluloses such as hydroxyethyl and hydroxypropyl cellulose are also suited.

According to the present process water or compounds in aqueous phase may be encased in polymeric capsules. When exposing the capsule to normal atmospheric circumstances, however, the encapsulated water will remain encased only for a limited time because of the relatively high water-permeability of the polymeric capsule wall. However, the substance dissolved or emulsified in the water will remain encased. Substances causing water to remain encased may be added either to the aqueous phase or to the polymer solution.

According to the process of the invention substances which will be released gradually may be encapsulated, this being of great importance for certain applications. The rapidity of the release is influenced by different factors such as the thickness and the porosity of the capsule wall but especially by the nature of the polymer used.

According to the present process the most divergent substances may be encapsulated and released later on, either gradually or at once. Among these substances may be mentioned: fertilizers, preservatives for plant-diseases, growing hormones, vitamins, all kinds of pharmaceutical products, magnetic iron oxide, adhesives, etc.

The capsules prepared according to the process of the present invention can also be widely applied in the photographic industry. For instance, ingredients may be encapsulated which may only be active in a determined stage of the photographic process and which, when being used in their usual form would give rise to undesired photographic phenomena.

Ingredients suited for being used in encapsulated form in the photographic process are among others:

(a) additives in the anti-stress layer for improving the high gloss, said additives being encased in capsules, the wall of which is sensitive to heat,
(b) very active hardeners which are only released after coating, for instance encased in capsules the wall of which bursts e.g. when rolling up the photographic material.
(c) development retarding agents in the light-sensitive layer,
(d) developers in the light-sensitive layer e.g. encased in capsules the wall of which is heat-sensitive,
(e) anti-halation or filter dyes which disadvantageously influence the light-sensitive layer.

In the photographic art, the process according to the invention may also be applied:

(a) in packet emulsions for one layer color material,
(b) in photopolymerisation systems for the encapsulation of stabilized monomers,
(c) in diffusion transfer processes or other rapid processes for the encapsulation of water or aqueous solutions, and
(d) in electrophotographic processes for the encapsulation of powder or liquid developers which would promote cleanness during manipulation.

The description and examples relate especially to the encapsulation of aqueous solutions. It is, however, also possible according to the same process to encapsulate aqueous dispersions and hydrophilic solid substances in the above-mentioned polymeric compounds.

The following examples illustrate the invention.

EXAMPLE 1

10 g. of copoly(vinylidene chloride/acrylonitrile) (80/20) are dissolved in 100 ccs. of cyclohexanone. In this solution 30 ccs. of a 1% aqueous solution of the dyestuff Acid Magenta A (Color Index 42,685) are emulsified and the emulsion is stirred vigorously for 10 minutes. Then the emulsion obtained is poured into 500 ccs. of a 1% aqueous gelatin solution of pH 6 at 45° C.

To the secondary emulsion thus obtained a mixture of 450 ccs. of methanol and 200 ccs. of water is gradually added thus extracting the cyclohexanone from the encapsulating film. In this way microcapsules are obtained surrounded by a hard strong capsule wall. If necessary the microcapsules may be separated according to one of the known methods.

EXAMPLE 2

10 g. of copoly(vinylidene chloride/acrylonitrile) (80/20) are dissolved in 100 ccs. of cyclohexanone. In this solution 30 ccs. of a 1% aqueous solution of the dyestuff Acid Magenta A (Color Index 42,685) are emulsified. The emulsion obtained is poured into 700 ccs. of a 1% aqueous gelatin solution of pH 6.5 at 45° C.

To the secondary emulsion thus obtained 250 ccs. of methanol are gradually added thus extracting the cyclohexanone from the encapsulating film. In this way microcapsules are obtained surrounded by a hard strong capsule wall. If necessary, the microcapsules may be separated according to one of the known methods.

EXAMPLE 3

5 g. of poly(styrene) are dissolved in 50 ccs. of carbon tetrachloride containing 0.01 g. of a wetting agent consisting of di(isobutyl)-naphthalene sulfonic acid. In this solution 15 ccs. of a 1% aqueous solution of the dyestuff Acid Magenta A (Color Index 42,685) are emulsified. The emulsion obtained is poured into 300 ccs. of a 1% aqueous gelatin solution of pH 4 at 60° C.

To the secondary emulsions thus obtained 600 ccs. of methanol are gradually added thus extracting the carbon tetrachloride from the encapsulating film. A hard strong capsule wall is obtained.

We claim:

1. Process for encapsulating a member selected from the group consisting of water and compounds in aqueous phase in a polymerized material soluble in a water-immiscible solvent and forming when free of said solvent a solid film insoluble in said water or aqueous phase comprising the following steps:
    (a) forming a solution of said film-forming, polymerized material in a solvent therefor which is immiscible with water,
    (b) emulsifying said member in said solution of said film-forming, polymerized material,
    (c) emulsifying the emulsion obtained from step (b) in an aqueous solution of a hydrophilic colloid, and
    (d) extracting the solvent for the polymerized material by adding a liquid which is miscible with water and with the solvent for said polymerized material, said liquid being no solvent for the polymerized material.

2. Process according to claim 1, wherein the polymerized material is copoly(vinylidene chloride/acrylonitrile) (80/20).

3. Process according to claim 1, wherein the polymerized material is poly(styrene).

4. Process according to claim 1, wherein the hydrophilic colloid is gelatin.

5. The process of claim 1 wherein the polymerized material is selected from the group consisting essentially of vinyl polymers, polycarbonates, polyesters, polysulfonates, polyurethanes, polyamides, chlorinated natural rubbers and cellulose derivatives.

References Cited

UNITED STATES PATENTS

| | | | |
|---|---|---|---|
| 2,969,331 | 1/1961 | Brynko et al. | 252—316 |
| 2,984,635 | 5/1961 | Harris | 117—100 X |
| 3,173,878 | 3/1965 | Reyes | 252—316 |

RICHARD D. LOVERING, Primary Examiner

U.S. Cl. X.R.

71—64, 65; 96—97; 252—62.1, 62.56; 424—32, 33